United States Patent
Vohlgemuth

(10) Patent No.: US 9,425,661 B2
(45) Date of Patent: Aug. 23, 2016

(54) ROTOR OF AN ELECTRIC MACHINE

(71) Applicant: MOTEURS LEROY-SOMER, Angouleme (FR)

(72) Inventor: Patrick Vohlgemuth, La Rochefoucauld (FR)

(73) Assignee: MOTEURS LEROY-SOMER, Angouleme (FR)

( * ) Notice: Subject to any disclaimer, the term of this patent is extended or adjusted under 35 U.S.C. 154(b) by 0 days.

(21) Appl. No.: 14/356,262

(22) PCT Filed: Oct. 31, 2012

(86) PCT No.: PCT/IB2012/056053
§ 371 (c)(1),
(2) Date: May 5, 2014

(87) PCT Pub. No.: WO2013/064998
PCT Pub. Date: May 10, 2013

(65) Prior Publication Data
US 2014/0252912 A1    Sep. 11, 2014

(30) Foreign Application Priority Data
Nov. 3, 2011    (FR) ..................... 11 59964

(51) Int. Cl.
*H02K 1/30* (2006.01)
*H02K 15/02* (2006.01)

(52) U.S. Cl.
CPC .............. *H02K 1/30* (2013.01); *H02K 15/026* (2013.01); *H02K 15/028* (2013.01)

(58) Field of Classification Search
CPC .................................... H02K 1/148

USPC .......... 310/216.008, 216.063, 216.061, 310/216.039, 216.43, 216.046, 216.009, 310/216.011, 216.044, 216.052, 216.113, 310/112–114, 49.42, 49.09, 49.22, 154.05, 310/154.37, 156.32, 156.25, 156.26, 310/156.71, 156.82, 216.013
See application file for complete search history.

(56) References Cited

U.S. PATENT DOCUMENTS

| | | | |
|---|---|---|---|
| 3,848,331 A * | 11/1974 | Pavlik et al. | 29/596 |
| 4,080,724 A * | 3/1978 | Gillette | 29/598 |
| 4,365,180 A * | 12/1982 | Licata et al. | 310/216.008 |
| 5,548,174 A * | 8/1996 | Siga et al. | 310/216.121 |
| 6,741,005 B2 * | 5/2004 | Vohlgemuth | 310/216.045 |
| 6,975,057 B2 * | 12/2005 | Gauthier et al. | 310/216.095 |
| 7,952,254 B2 * | 5/2011 | Cho | H02K 1/187 310/216.001 |
| 2002/0135260 A1* | 9/2002 | Petersen | 310/216 |
| 2004/0056556 A1* | 3/2004 | Fujita | 310/217 |

(Continued)

FOREIGN PATENT DOCUMENTS

DE    10 2006 000 426 A1    3/2007

OTHER PUBLICATIONS

Jul. 15, 2013 International Search Report issued in International Application No. PCT/IB2012/056053 (with translation).

(Continued)

*Primary Examiner* — Naishadh Desai
(74) *Attorney, Agent, or Firm* — Oliff PLC

(57) ABSTRACT

The invention relates to a rotor of a rotary electric machine, in particular for a flux-switching or wound-rotor machine, a mounting for installing the rotor on a shaft and a plurality of magnetic sectors, preferably in the form of a strip, attached to the mounting.

27 Claims, 3 Drawing Sheets

(56) References Cited

U.S. PATENT DOCUMENTS

Figure 3:
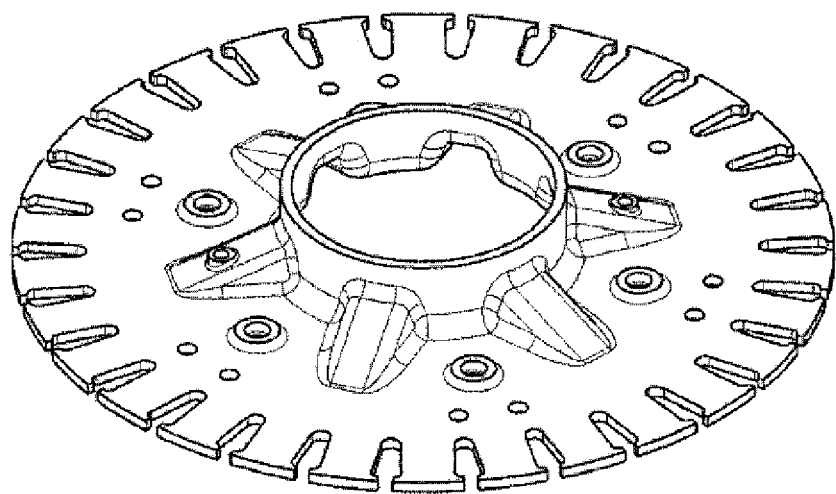

| | | | |
|---|---|---|---|
| 2005/0127775 A1* | 6/2005 | Lee | D06F 37/304 310/43 |
| 2005/0231060 A1* | 10/2005 | Vollmer | 310/216 |
| 2007/0046125 A1* | 3/2007 | Torii et al. | 310/156.53 |
| 2008/0201936 A1* | 8/2008 | Hoshino et al. | 29/598 |
| 2010/0236297 A1* | 9/2010 | Ahn | D06F 37/304 68/212 |
| 2011/0016929 A1* | 1/2011 | Ahn | D06F 37/304 68/140 |

OTHER PUBLICATIONS

Jul. 15, 2013 Written Opinion issued in International Application No. PCT/IB2012/056053 (with translation).

Jul. 11, 2012 French Written Opinion issued in French Application No. FR 1159964 (with partial translation).

* cited by examiner

ROTOR OF AN ELECTRIC MACHINE

The present invention relates to rotating electric machines and, more particularly, to rotors, notably of alternators.

It is known from U.S. Pat. No. 6,975,057 to cut segments intended to produce a magnetic circuit.

It is also known from U.S. Pat. No. 6,741,005 notably to cut a magnetic plate in a strip and bend it to form a magnetic circuit.

The exciting armature magnetic circuits conventionally consist of a stack of plates. The armature plates are very often cut from the central portion of the plates of the inductor, or even from a specific strip of plate if the inductor is cut separately or produced by casting.

The consumption of magnetic plate to produce the armature is then equal either to a cylinder, or to a parallelepiped of equivalent dimensions.

The difference between the magnetic plate consumed and the material actually needed for the conduction of the magnetic flux is very great. It is not uncommon for the raw material used to represent twice the material that is useful to the passage of the flux. The invention aims to further refine the production of the magnetic circuit of the rotor.

The subject of the invention, according to one of its aspects, is a rotor of a rotating electric machine, notably for a wound-rotor or flux-switching machine, comprising:
- a support for mounting the rotor on a shaft,
- a plurality of magnetic segments, preferably in a strip, fastened onto the support.

The invention makes it possible to reduce, for example by approximately one third, the quantity of the material consumed to produce an exciting armature.

Furthermore, when the armature and the inductor are cut conventionally on a complete tool, therefore from the same plate, these two components are, de facto, produced from a grade of material which corresponds to the same degree of magnetic performance.

With the invention, the fact that the cutting of the plates used to produce the armature is dissociated from the cutting of the plates used to produce the inductor offers the possibility of using different material grades, by optimizing the choice of the material grade to the real need of each of the components and therefore to reduce the overall cost.

Another advantage of the invention is that the support may be made of stamped plate, and consequently, its longitudinal bulk is less than a conventional stack of plates. It is therefore possible to reduce the overall length of the machine by exploiting this available space to insert therein one or more functions such as balancing, diode bridge or bearing race.

The segments may belong to strips of segments which each occupy less than one complete revolution on the rotor. As a variant, the segments may belong to one or more strip(s) of segments wound on themselves over one or more than one complete revolution. The angular extent of each strip of segments may be between 60 and 360°, preferably being 120°.

Each segment may comprise two half-teeth, or even only two half-teeth. As a variant, each segment comprises at least one tooth.

The rotor preferably comprises segments on the two opposite faces of the support. In this case, the strips of segments are advantageously offset angularly from one face of the support to the other, which enhances the mechanical cohesion of the rotor. The offset is, for example, 60°.

The segments preferably comprise a number of superposed magnetic plates, for example snap-fitted to one another. The segments may be linked together at the level of the teeth. At least two adjacent segments may be linked together by a bridge of material made of the same material as the plate of the segments.

The rotor may comprise a balancing counterweight, fastened onto the support.

Other components may be fastened onto the support, for example a diode bridge used to supply the main inductor of the alternator, or an electronic circuit for regulating the voltage at the terminals of the main inductor.

The support may have a generally discoid shape.

The support may be formed by stamping a plate. The support may comprise rigidifying ribs each extending in a radial direction.

The support may have, at the periphery, notches which are superposed with notches of the segments.

The rotor may comprise a void, notably in the form of a drop of water, adjacent to the bridge of material linking two adjacent segments.

The number of poles of the rotor is preferably greater than or equal to 4.

The segments are preferably produced from a plate with a carbon content by weight of less than or equal to 0.07%.

The strips of segments may bear windings.

Also the subject of the invention is a method for manufacturing a rotor as defined above, comprising steps consisting in:
- cutting the strip of segments from a magnetic plate,
- bending the strip,
- fastening the strip onto the support, notably using rivets.

Also the subject of the invention is a rotating electric machine comprising a rotor according to the invention.

The stator may advantageously comprise plates defining the magnetic circuit of the stator, cut from a different material, for example with a higher carbon content, from that used to produce the segments of the rotor.

The machine may in particular be an alternator and the rotor according to the invention may constitute the rotor of the exciter.

Figure 1:
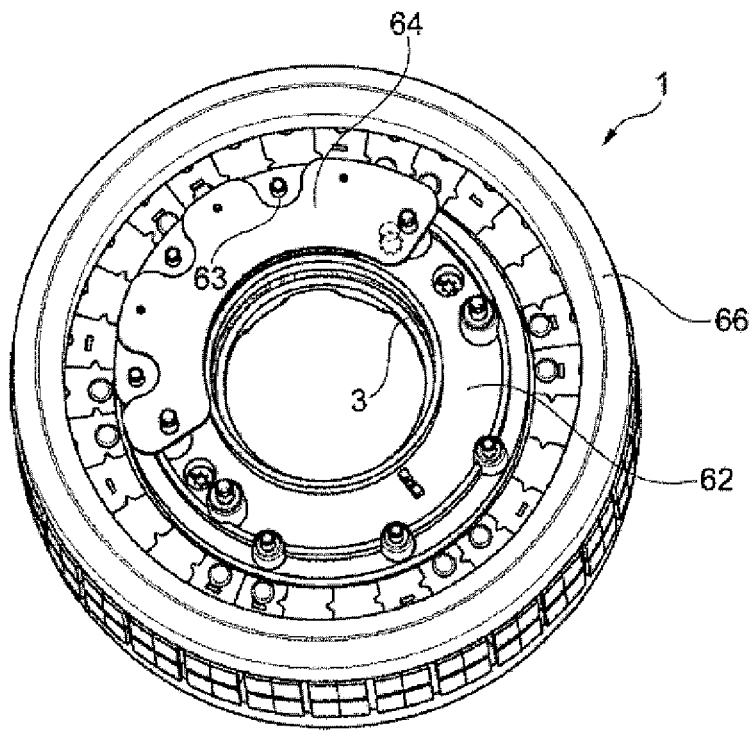
Figure 2:
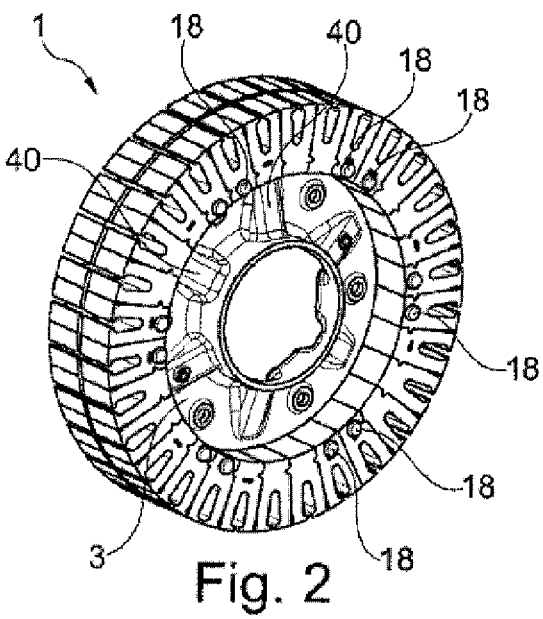
Figure 5:
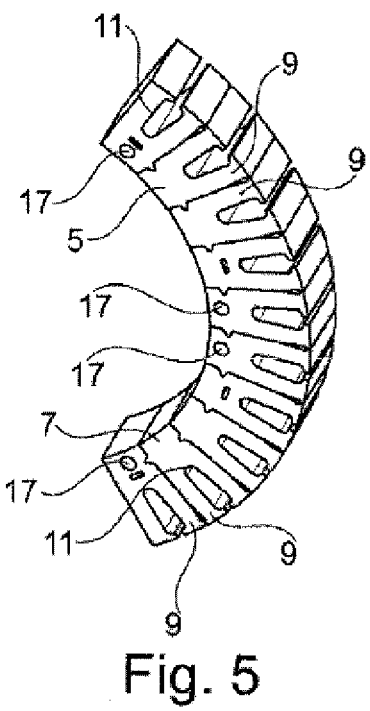
Figure 6:
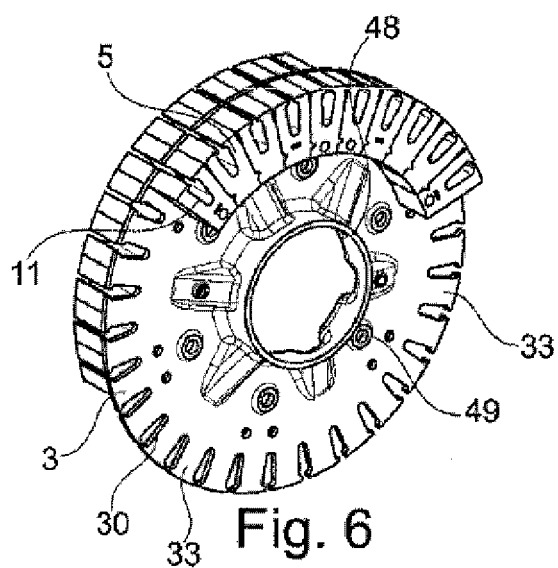
Figure 4:
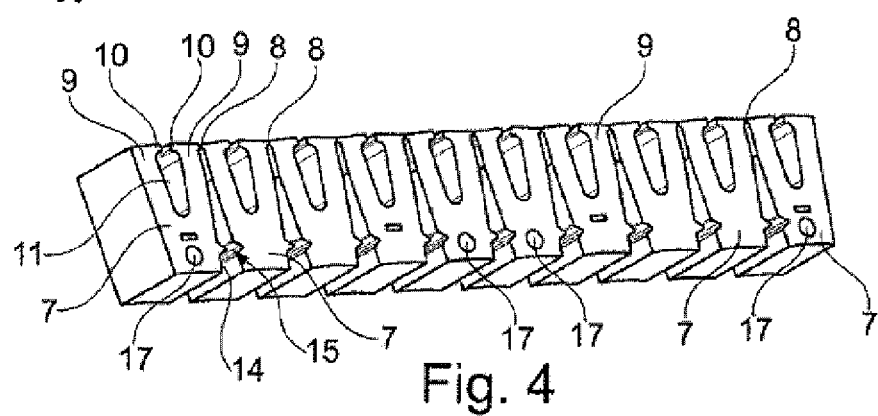
Figure 7:
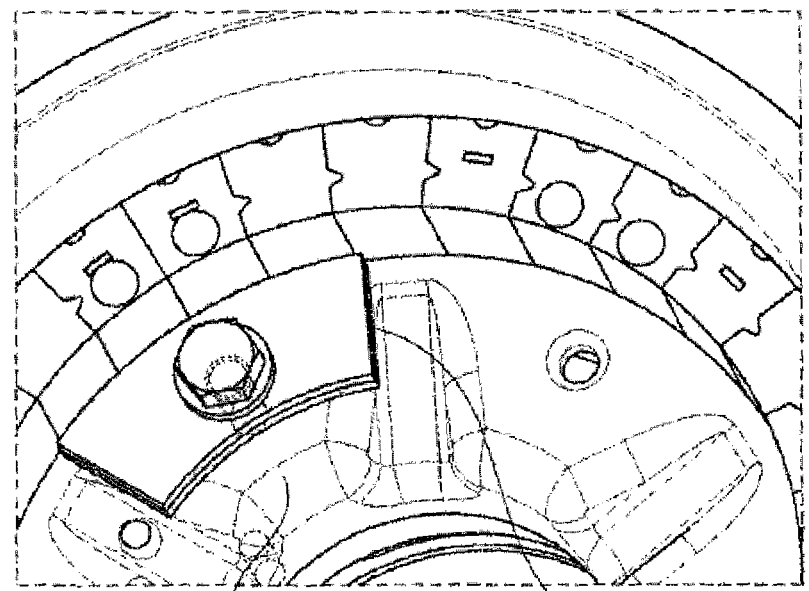
Figure 8:
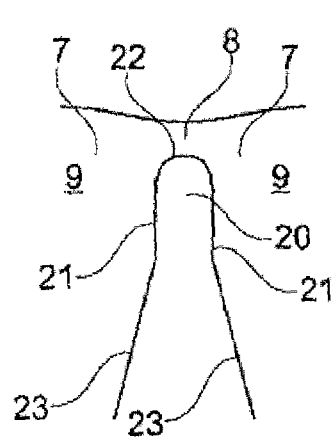
Figure 9:
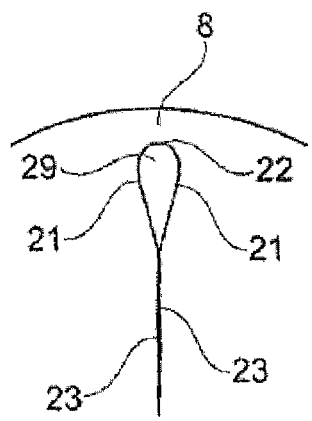
Figure 10:
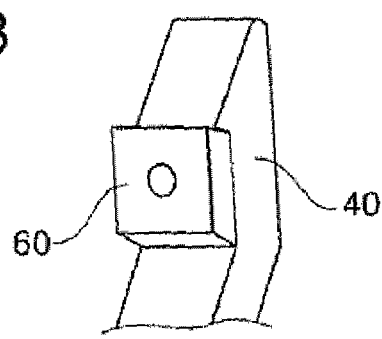

The invention may be better understood from reading the following detailed description of a nonlimiting exemplary implementation thereof, and on studying the appended drawing, in which:

FIG. 1 represents, schematically and partially and in perspective, an example of a rotor produced according to the invention, FIG. 2 represents the magnetic circuit of the rotor, in place on the support, FIG. 3 represents, in isolation, the support, FIG. 4 represents a strip of segments before bending, FIG. 5 represents the strip of segments after bending, FIG. 6 illustrates the mounting of the strips of segments on the support, FIG. 7 illustrates the possibility of fastening a balancing counterweight onto the support, FIGS. 8 and 9 represent a detail of production of a plate used to produce a strip of segments, and FIG. 10 illustrates the possibility of fastening an electronic component directly onto the support, in order to dissipate the heat released by this component.

The rotor 1 represented in the figures is an exciting rotor, but the invention is not limited to such a rotor and can be applied to the rotors of various rotating electric machines, wound or not, such as flux-switching machines for example.

The rotor 1 comprises, as can be seen notably in FIG. 2, a support 3, also called wheel rim, on which are fastened strips 5 of segments, one of which is represented in isolation in FIG. 5.

The wheel rim 3 is, for example, made of stamped plate.

Each strip 5 is, for example, fainted, as illustrated, by a succession of segments 7, two adjacent segments 7 being able to have, on their facing flanks, two reliefs 14 and 15 intended to cooperate when the strip is bent, such as, for example, a tooth and a notch of complementary shapes.

Certain segments 7 may also have, as illustrated, a hole 17 allowing for the passage of a fastening element 18 onto the rim 3, such as, for example, a rivet.

The strip 5 of segments may comprise, in particular, as illustrated, two end segments 7 each provided with a hole 17 and two medium segments, also provided with a hole 17.

The reliefs 14 and 15, just like the holes 17, are preferably formed at a short distance from the radially outer edge of the segments 7.

Each segment 7 comprises two half-teeth 9, which delimit between them a notch 11, and are each provided with a pole shoe 10. The notch 11 is thus open on the outside.

FIG. 8 shows, on an enlarged scale, the bridge of material 8 linking two adjacent segments 7, before they are put in place on the rim 3. This bridge of material 8 links the segments 7 on the side of the teeth 9, preferably without protruding on the cylindrical surface facing the air gap on the finished rotor.

The bridge of material 8 is delimited, on the radially inner side, by a rounded edge 22, linked to initially rectilinear and parallel edges 21. The latter are connected to rectilinear edges 23 which initially diverge. The presence of the edges 21 makes it possible to not embrittle the plate-cutting tool.

When the segments 7 are brought together in order to give the strip 5 its final arched shape, which can be seen in FIG. 5, the edges 21 come together and form, with the edge 22, a profile in the form of a drop of water, while the edges 23 come together, as illustrated in FIG. 9. The voids 29 delimited by the edges 21 and 22 are not apparent in FIG. 5.

The presence of the void 29 with the profile in the form of a drop of water is not a problem, because it is situated in a region where the magnetic flux is weak while the machine is operating.

The rim 3 comprises, on its periphery, a succession of notches 30 which are superposed with the notches 11 when the segments 7 are in place. The notches 30 are formed between the teeth 33 provided, for example, as illustrated, with pole shoes which are superposed with the shoes 10.

Thus, the segments 7 can receive windings 66 when fastened onto the rim 3.

The strips 5 of segments 7 are advantageously arranged on the rim 3 by being offset circumferentially from one face to the other, as illustrated in FIG. 6. The offset is, for example, θ/2, in which θ designates the angular extent of a strip 5 of segments 7, with θ=360/n where n is the number of strips of segments used to make a complete ring.

In the example illustrated, θ is 120° and the strips 5 of segments 7 are offset by 60° from one face to the other. This offset makes it possible to align the hole 17 of an end segment of a strip of segments located on one side of the rim 3 with that of a medium segment of the strip arranged on the opposite side of the rim 3.

The rim 3 can be produced, as illustrated, with rigidifying ribs 40 which extend, for example, radially from a hub 48, cylindrical of revolution about the axis of the rotor, intended for mounting on a shaft which is not represented.

The rim 3 is advantageously produced using stamped plate.

Drill-holes 49 can be provided on the rim 3 in order to mount miscellaneous components thereon, for example a balancing counterweight 50, as illustrated in FIG. 7.

It is also possible to arrange on the rim 3, as illustrated in FIG. 1, various electronic circuits, for example a rectifier. In this figure, it can be seen that it is possible to fasten onto the rim 3 an insulating support 62, on which rests a printed circuit 63 and a copper shunt 64. In this figure, the windings 66 of the rotor are represented schematically.

Each strip 5 of segments 7 can be formed by a bundle of superposed plates snap-fitted together. The cutting of the plates can be done in strips to save on material. After cutting, the strip 5 is, for example, substantially straight, as illustrated in FIG. 4. The strip 5 is given its final shape by bending it at the bridges of material 8.

The notches 11 can be wound after the segments 7 are fastened onto the rim 3.

The rim 3 can be used as a heat dissipater, if necessary, by fastening the component(s) to be cooled onto it, as illustrated in FIG. 10, in which a diode 60 can be seen, fastened onto a receiving sole plate formed on the rim 3, for example at the level of a cooling rib 40.

If necessary, a grommet or clearance for running electrical cables is incorporated in the rim 3.

The magnetic circuit of the rotor can be produced with plates with a lower carbon content than those of the stator, because the exciting armature is in less magnetic demand.

It is possible for example to use, to produce the segments 7, a steel with a carbon content of between 0 and 0.07%.

Preferably, the number of poles of the rotor is greater than or equal to 4, the invention not being limited to the polarity illustrated.

The rim 3 can be produced using a magnetic or nonmagnetic material.

In a variant, the rim 3 is produced without the notches 30 or without the pole shoes 33, not extending, for example, as far as the periphery of the magnetic circuit of the rotor.

Rather than using a number of strips of segments arranged one after the other to reconstruct a ring on each side of the rim 3, it is possible to use a strip of segments whose length is such that it extends over one complete revolution, or more than one complete revolution about the axis of rotation.

The invention is not limited to the example illustrated. For example, the rotor is not wound and used in a flux-switching machine.

The expression "comprising a" should be understood to be synonymous with "comprising at least one", unless specified otherwise.

The invention claimed is:

1. A rotor of a rotating electric machine comprising:
a support having a generally discoid shape for mounting the rotor on a shaft, and
a plurality of magnetic segments that are fastened onto the support such that the segments are disposed on two axially opposite faces of the support,
wherein an outer periphery of the support has notches that are superposed axially with notches of the segments.

2. A rotor of an alternator exciter, comprising:
a support for mounting the rotor on a shaft, and
a plurality of magnetic segments that are fastened onto the support such that the segments are disposed on two axially opposite faces of the support,
wherein an outer periphery of the support has notches that are superposed axially with notches of the segments.

3. The rotor according to claim 1, wherein the segments are in a strip.

4. The rotor according to claim 1, wherein the segments belong to strips of segments which each occupy less than one complete revolution on the rotor.

5. The rotor according to claim 1, wherein the segments belong to one or more strip of segments wound on themselves over one complete revolution or more than one complete revolution.

6. The rotor according to claim 1, wherein an angular extent of each strip of segments is between 60 and 360°.

7. The rotor according to claim 1, wherein each segment comprises at least two half-teeth.

8. The rotor according to claim 1, wherein the segments form strips that are offset angularly from one face of the support to the other.

9. The rotor according to claim 1, wherein the segments comprise a number of superposed magnetic plates that are snap-fitted to one another.

10. The rotor according to claim 1, further comprising a balancing counterweight that is fastened onto the support.

11. The rotor according to claim 1, further comprising an electronic circuit that is fastened onto the support.

12. The rotor according to claim 11, wherein the electronic circuit comprises at least one rectifying diode.

13. The rotor according to claim 1, wherein the support is formed by stamping a plate.

14. The rotor according to claim 1, wherein the support comprises rigidifying ribs that each extend in a radial direction.

15. The rotor according to claim 1, wherein at least two adjacent segments are linked together by a bridge of material that is made of the same material as the segments.

16. The rotor according to claim 15, further comprising a void that is adjacent to the bridge of material.

17. The rotor according to claim 16, wherein the void is in the shape of a drop of water.

18. The rotor according to claim 1, wherein a number of poles of the rotor is greater than or equal to 4.

19. The rotor according to claim 1, wherein the segments are produced from a plate with a carbon content by weight of less than or equal to 0.07%.

20. The rotor according to claim 1, wherein the segments bear windings.

21. A rotating electric machine, comprising a rotor as defined in claim 1.

22. The machine according to claim 21, further comprising a stator having a magnetic circuit produced with plates cut from a different material from that used to produce the segments.

23. The machine according to claim 22, wherein the cut plates have a higher carbon content than of the segments.

24. A method for manufacturing a rotor, the rotor including:
 a support having a generally discoid shape for mounting the rotor on a shaft, and
 a plurality of magnetic segments that are fastened onto the support such that the segments are disposed on two axially opposite faces of the support,
 wherein an outer periphery of the support has notches that are superposed axially with notches of the segments,
  the method comprising:
   cutting a strip of segments from a magnetic plate,
   bending the strip, and
   fastening the strip onto the support.

25. The rotor according to claim 1, wherein the rotor is a wound-rotor or the rotating electric machine is a flux-switching machine.

26. The rotor according to claim 20, wherein the notches of the support and the notches of the segments receive the windings therein.

27. The rotor according to claim 2, wherein the notches of the support and the notches of the segments receive windings therein.

* * * * *